Dec. 15, 1942.                G. M. GRAHAM                2,305,076
BEARING CUP REMOVING TOOL
Filed July 10, 1941

INVENTOR.
George M. Graham
BY Parker & Burton
ATTORNEYS

Patented Dec. 15, 1942

2,305,076

UNITED STATES PATENT OFFICE 2,305,076

BEARING CUP REMOVING TOOL

George M. Graham, Detroit, Mich., assignor to Hinckley-Myers Company, Jackson, Mich., a corporation of Michigan Application July 10, 1941, Serial No. 401,853

2 Claims. (Cl. 29—88.2)

This invention relates to an improved tool or device for removing a bearing cup bushing or other like member from a recess within which the member is seated.

It is intended for use in connection with bushings, bearing races, or the like which are seated within blind recesses or openings which do not permit insertion of a tool from the opposite side to engage the bushing to kick it from the recess.

An object is to provide a tool which is simple, inexpensive, very easily operable and which is adapted for use with different size bearing cups, bushings, or the like.

Figure 1:
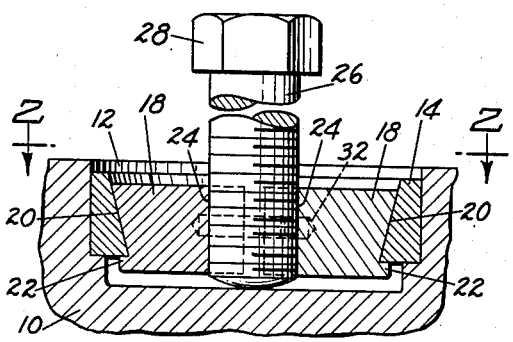
Figure 2:
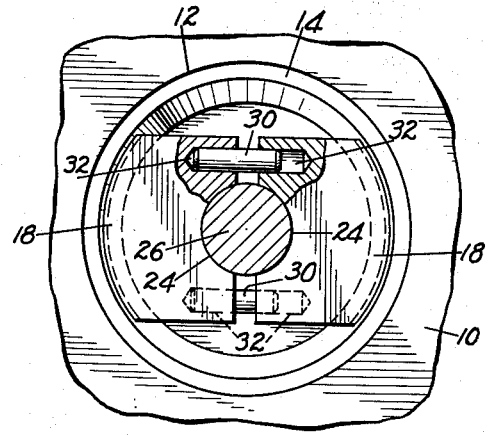
Figure 3:
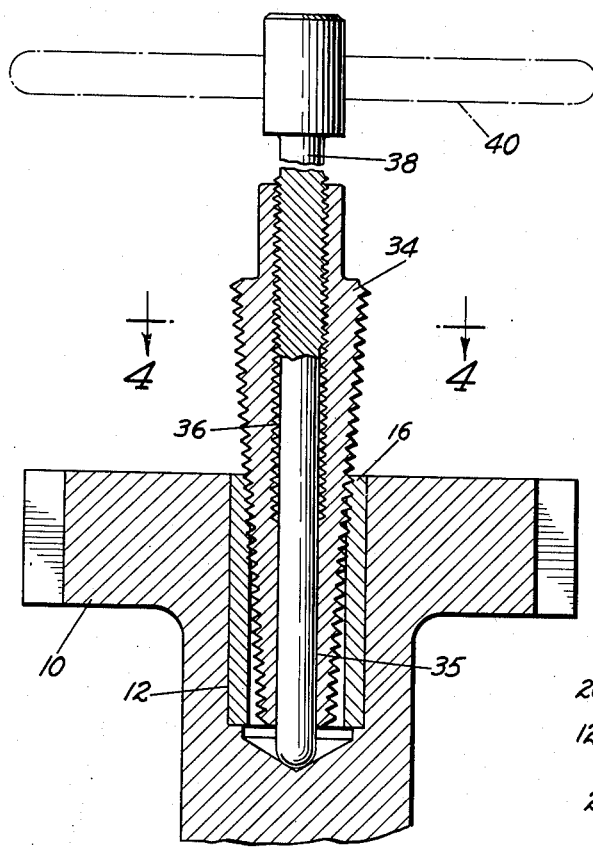
Figure 4:
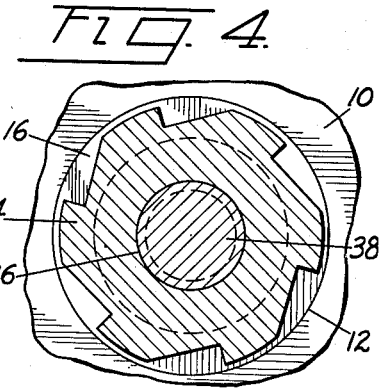
Figure 5:
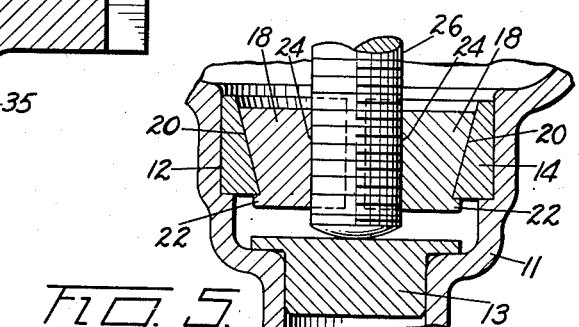

Other objects, advantages and meritorious features of the invention will more fully appear from the following description, appended claims, and accompanying drawing, wherein:

Figure 1 is a cross section partly broken away through a bearing cup illustrating my improved tool in use, Fig. 2 is a horizontal sectional view taken on line 2—2 of Fig. 1, Fig. 3 is a vertical sectional view through a bushing illustrating a modified form of tool positioned to withdraw the bushing, Fig. 4 is a horizontal sectional view taken on line 4—4 of Fig. 3, and Fig. 5 is a sectional view through a different form of bearing support showing the device of Figs. 1 and 2 in use therein.

When a bushing or outer bearing race or other similar element is received within a recess which does not have an opening from the opposite side through which a tool may be inserted to remove the bushing, its removal is frequently attended with considerable difficulty and it is not uncommon that the removal can be accomplished only by disfiguring or destroying the bushing or bearing cup.

My improved tool is illustrated in two embodiments. These two alternative structures embody a fundamental concept but differ from each other in construction. With the preferred form illustrated in Figs. 1 and 2 the removal of the bushing, bearing cup, or the like may be accomplished without in any way disfiguring such bearing element. In the form of construction shown in Figs. 3 and 4, which is the alternative form, the inner face of the bearing race or bushing is disfigured by the functioning of the tool.

In the views illustrated in the four figures of the drawing, 10 indicates a frame or casting member provided with a recess 12 within which an outer bearing race 14 or bushing 16 is seated. The recess within which the bushing is seated is not provided with any opening thereinto from the opposite side so that it is not possible to insert a tool to knock the member 14 or member 16 therefrom. The recess is what might be termed a blind one. In the structure of Fig. 5 the bearing member 14 is carried by a housing 11 such as axle tube. Though such housing is hollow it is not readily feasible to get at the bearing member from the rear to remove it. A plug 13 is dropped into the end of the housing as shown in Fig. 5 and the tool itself is operated as is hereinafter described in connection with the structure of Figs. 1 and 2.

In the form of tool shown in Figs. 1 and 2 there is provided means 18 in the form of two jaw elements. These two jaw elements are comparable to each other and are receivable within the bearing cup within the recess as shown particularly in Fig. 1. Each jaw element has an outer tapered face 20 and a lip 22 which projects beyond such outer face and overhangs an end face of a bearing cup 14 as shown in Fig. 1.

The inner faces of these two jaws have portions 24 which are shaped and threaded complementary to each other providing an axial opening adapted to threadedly receive a threaded shaft 26, which shaft is provided with a turning head 28.

The two jaws are held together while having permitted relative movement toward and away from each other by two pins 30. The jaws are provided with complementary recesses 32 adapted to receive the ends of the pins as shown in Fig. 2 and the permitted slidable movement of one jaw relative to the other upon the pins is greater than the sum of the overhang of the lips or shoulders 22 so that the jaws may be collapsed toward each other upon the pins and received within the bearing cup 14 and projected therethrough sufficiently to permit the lips to overhang the end face of the bearing cup upon spreading of the jaws apart.

To withdraw the bearing member the jaws are spread apart and the threaded shaft 26 is inserted therebetween and threadedly engaged therewith and advanced therethrough between the jaws to engage the bottom of the recess 12. The two jaws are held against axial misalignment by the pins 30 and as the shaft is threaded downwardly the jaws are backed out upon the shaft and carry within them the bearing cup 14. The head 28 of the shaft may be engaged by a wrench or turning tool or it might be provided with a handle as shown in Fig. 3.

In the construction of Fig. 3 the general idea is similar but the details differ. There is here provided a tapered tap 34 which may be threaded into the bushing 16 cutting its way thereinto. This tap has an axial opening 34 therethrough which corresponds to the axle opening 24 between the jaw members 18. This opening or passageway 35 is interiorly threaded as at 36 and a threaded shaft 38 is inserted through the opening and threadedly engaged therewith. As it is projected through the opening it seats against the bottom of the recess 12 and backs the bushing 16 out of the opening in a manner which is well understood. This shaft may be provided with a handle 40 whereby it may be rotated.

What I claim is:

1. A tool for removing a bearing cup, bushing, or other like member from a recess within which the member is seated comprising a pair of complementary jaws receivable within said member having an outer face opposed to the inner face of the member and provided with lips projecting beyond the outer faces and adapted to overhang an end face of said member, said jaws having inner face portions shaped and threaded to receive therebetween a threaded shaft element, a threaded shaft element threadedly engaged with and between said threaded face portions and extending through and beyond the jaws and adapted to engage the bottom of the recess and a pair of pins extending between said jaws upon opposite sides of said threaded shaft and substantially midway the length of the jaws, said jaws being slidably supported upon the pins for movement toward and away from each other while being held in axial alignment by said pins.

2. A device for removing an interiorly tapered bearing member from a recess within which it is seated comprising a pair of complementary jaws having tapered outer faces adapted to seat against the inner face of the member and having a lip projecting outwardly beyond the smaller diameter end of the outer faces of said jaws adapted to overhang an end face of the member, said jaws having opposed inner faces provided with portions shaped and threaded to receive therebetween a threaded shaft, a threaded shaft threadedly engaged between said shaped and threaded portions of the inner face of the jaws and extending through and between said jaws and projecting therebeyond to seat against the bottom of the recess, a pair of pins arranged on opposite sides of the shaft and coupling said jaws together for slidable movement toward and away from each other, said jaws having a permitted slidable movement upon the pins greater than the sum of the projection of the lips of the two jaws beyond their outer faces and held by the pins against axial displacement.

GEORGE M. GRAHAM.